UNITED STATES PATENT OFFICE 2,069,262

MANUFACTURE OF CHLORINATED RUBBER

Terence Neil Montgomery, Runcorn, England, assignor to Imperial Chemical Industries Limited, a corporation of Great Britain No Drawing. Application February 11, 1935, Serial No. 6,127. In Great Britain February 13, 1934

8 Claims. (Cl. 260—1)

This invention relates to an improved process for the manufacture of chlorinated rubber by the direct chlorination of rubber in the absence of solvent materials.

It has previously been proposed to react chlorine with rubber in the absence of solvent materials, batches of rubber in the form of thin strips being subjected to the chlorine under pressure and at an elevated temperature.

According to the present invention solid chlorinated rubber is produced directly by subjecting finely divided rubber simultaneously to an abrading action and to the action of chlorine gas. In carrying out the process the abrading action may be conveniently produced by subjecting the rubber, in the form of thin strips or the so-called crumb rubber, to vigorous agitation during the chlorination or by performing the reaction in a rotating drum or cylinder which may be of enamelled iron or lead lined. Usually sufficient abrasion is produced by the contact of the particles of rubber with one another, but if desired pieces of inert material may also be present. By this action I find that the chlorination products which form first on the outer surface of the rubber particles, are continuously removed as a very fine powder and a fresh surface exposed for further chlorination. From time to time the fine powder of the chlorinated material which is rubbed off may be separated from the coarser incompletely chlorinated material by sieving or air blowing, and the coarse material then returned for further chlorination.

In practicing the present invention, pressure sufficient to liquefy chlorine at the temperature of chlorination or sufficient to cause the formation of a liquid phase such as may be formed by absorption of chlorine by rubber or chlorinated rubber are to be avoided; otherwise the effect of chlorinating in the absence of solvents while simultaneously subjecting the rubber to an abrading action to produce chlorination products as a fine powder is not realized. Any other pressure may be employed and in general chlorination at atmospheric pressure produces excellent results.

I have also found that the process may be made substantially continuous by passing the chlorine through the drum in a stream of sufficient velocity to carry away the very fine particles of fully chlorinated product which have been rubbed off the surface of the rubber. On emerging from the chlorinating apparatus, the stream of gas is passed through a cyclone separator or similar device in which the solid particles are recovered. The chlorine gas stream is then passed on to a water scrubber for the removal of hydrogen chloride, after which it may be dried and returned to the chlorination step.

One method of carrying out the process of the invention is illustrated by the following example:—

Example 100 parts by weight of crumb rubber are exposed to a slow stream of chlorine in a jacketed vessel fitted with an agitator, revolving at about 1000 revs. per minute. The exit gases from the apparatus are scrubbed with water for the removal of hydrogen chloride and after drying are used for a further chlorination. During the reaction the temperature is maintained at about 60° C. for 42 hours, after which it is raised to about 90° C. for a further 24 hours. Chlorination is then stopped and the chlorine remaining in the vessel removed by an air current, after which the very fine material is separated by sieving and the partially chlorinated coarse material returned for further chlorination along with a further quantity of crumb rubber. 61 parts by weight of fine product containing 63% of chlorine are obtained.

I claim:—

1. Process for the manufacture of chlorinated rubber which comprises reacting rubber in a finely divided condition with chlorine in the absence of solvent materials while simultaneously subjecting it to mechanical abrasion.

2. A process for the preparation of chlorinated rubber which comprises subjecting finely divided rubber in the absence of a solvent to the action of chlorine, said rubber being simultaneously subjected to the action of a rapidly revolving agitator in order to bring about mechanical abrasion in such manner that the chlorinated product is continuously removed as a finely divided product and fresh rubber surfaces are exposed for further chlorination.

3. A process for preparing chlorinated rubber which comprises subjecting finely divided rubber in the absence of a solvent to the action of chlorine, said rubber being simultaneously subjected to abrasion by rotating the vessel containing it so as to continuously remove the chlorinated product in the form of a fine powder and expose fresh surfaces of the rubber for further chlorination.

4. A process for preparing chlorinated rubber which comprises subjecting finely divided rubber in the absence of a solvent to the action of chlorine, said finely divided rubber being simultaneously subjected to the abrasive action of inert solid bodies by rotation of the vessel containing said rubber and inert solid bodies so as to continuously remove the chlorinated product as a fine powder and expose fresh surfaces of the rubber for further chlorination.

5. A process as set forth in claim 1 in which the finely powdered chlorinated product removed from the surface of the rubber as the result of the mechanical abrasion is subsequently separated therefrom by sieving.

6. A process as described in claim 1 in which the finely powdered chlorinated product removed from the surface of the rubber as a result of the mechanical abrasion is subsequently separated therefrom by blowing a stream of air over the mixed product so as to carry away the finely powdered chlorinated rubber product.

7. A continuous process for preparing chlorinated rubber which comprises subjecting finely divided rubber in the absence of a solvent to the action of a stream of chlorine and simultaneously subjecting said finely divided rubber to mechanical abrasion, said chlorine being supplied to said rubber in a stream of sufficient velocity to carry away the fine particles comprising the chlorinated product, carrying away said fine particles of chlorinated rubber in said stream of chlorine, removing the finely divided particles of chlorinated rubber from said stream of gas, removing hydrogen chloride from said stream of gas and then returning said purified gas to the reaction vessel.

8. A process for the preparation of chlorinated rubber which comprises reacting finely divided rubber particles with chlorine at substantially atmospheric pressure in the absence of a solvent while simultaneously subjecting said rubber particles to mechanical abrasion.

TERENCE NEIL MONTGOMERY.